Sept. 10, 1963 N. A. PIERSON 3,103,301
REFUSE ACCUMULATOR AND METERING DEVICE
Filed April 14, 1961 2 Sheets-Sheet 1

INVENTOR.
NORMAN A. PIERSON
BY
Dunlap, Laney & Hubbard,
ATTORNEYS

Sept. 10, 1963 N. A. PIERSON 3,103,301
REFUSE ACCUMULATOR AND METERING DEVICE
Filed April 14, 1961 2 Sheets-Sheet 2

INVENTOR.
NORMAN A. PIERSON
BY
Dunlap, Laney & Hubbard
ATTORNEYS

United States Patent Office 3,103,301
Patented Sept. 10, 1963

3,103,301
REFUSE ACCUMULATOR AND METERING
DEVICE
Norman A. Pierson, Norman, Okla.
Filed Apr. 14, 1961, Ser. No. 103,136
4 Claims. (Cl. 222—310)

This invention relates to a device for accumulating waste materials, such as municipal refuse, and for discharging the accumulated refuse in metered amounts for subsequent processing. More particularly, but not by way of limitation, the present invention relates to a refuse accumulator and metering device for utilization in a system for converting municipal refuse to beneficial products.

Systems are presently in use for economically disposing of waste materials such as municipal refuse by recovering valuable salvageable components from such waste material, or by converting the material into useful products such as compost or certain organic chemicals. In such systems, it is necessary to provide some type of storage area where the refuse and waste material may be collected and accumulated as it is delivered in individual loads by municipal collection trucks. It is further necessary to provide means for moving the refuse in apportioned or metered amounts from the point of accumulation into the plant where it is to be subjected to salvage, composting or chemical conversion operations. In selecting an area where the raw refuse may be accumulated, or in designing a storage bin for holding such accumulated refuse, several major considerations must be taken into account. Thus, the container or bin in which the raw refuse is accumulated must be of sufficient size, and sufficiently conveniently located to readily accommodate the intermittent dumpings from refuse trucks. The storage container must also be sufficiently isolated from the processing plant to prevent the spread to the interior of the plant of any fire which may originate in the accumulated refuse. An adequate closure means should be provided to allow the accumulated refuse container to be completely closed off from the processing plant so that pests and vermin which may frequent the accumulated refuse will be prevented from entering the plant.

In addition to the foregoing factors which must be considered in the design of the refuse accumulator per se, it is further necessary to provide some means for controlling and metering the flow of accumulated refuse from the accumulator into the processing plant. For example, whether the raw refuse is first manually classified into salvageable components, or is, instead, first introduced to certain grinding or homogenizing apparatus, it is highly desirable that an even flow of the refuse in volumes which are not excessive be provided from the accumulator into the plant. Although certain types of refuse metering devices have been previously proposed for use in conjunction with refuse accumulator bins, certain disadvantages have been characteristic of such metering devices. For example, one such metering device which has previously been utilized comprises a paddle-wheel structure which moves relatively uniform amounts of the refuse out of the accumulator bin by the action of the rotating paddles. Such paddle-wheel structures do not function well over long periods of operation because the paddles become fouled with chunks of cardboard, wire, bedsprings and similar components frequently found in municipal refuse. Moreover, the paddles frequently shear off, destroying the effectiveness of the paddle wheel as a metering device. Finally, the paddle-wheel type metering device accomplishes very little or no comminution and mixing of the refuse so that subsequent grinding operations are rendered more difficult.

Another type of metering device which has previously been utilized in conjunction with refuse accumulators comprises a vibrating, horizontally extending hopper which is disposed in the accumulator bin and functions to vibrate the accumulated refuse out of the bin in relatively uniform amounts. Although the vibrating hopper type metering device does accomplish some breaking up or comminution of the refuse, such systems require excessive power for their operation and tend to become economically infeasible in some instances.

The present invention contemplates a novel refuse accumulator and metering device which is simpler in construction, yet more efficient in operation than previous devices of this type. The accumulator and metering device of the present invention broadly comprises a generally rectangularly shaped housing for receiving and storing accumulated raw refuse prior to its introduction to a processing plant, a novel conveyor in the bottom of the housing for supporting the raw refuse and moving it across the housing, and a novel metering device located at one side of the housing for effecting a partial comminution of the refuse while simultaneously delivering the refuse to the interior of the processing plant in a constant and uniform flow. The metering device employed in the invention is quite simple in construction and yet effectively controls the discharge of refuse from the accumulator in uniform amounts. The rate of discharge of refuse from the accumulator may be accurately controlled at all times so that the capacity of the processing plant to handle differing types of refuse may be easily accommodated.

In a preferred embodiment of the invention, the metering means employed comprises a vertically movable door which extends upwardly over one end of the conveyor located in the accumulator housing, and which is adjusted in its vertical position to regulate the size of an opening through the housing wall through which the accumulated refuse is discharged by the conveyor. The size of this opening determines the rate at which the refuse is fed from the accumulator into the processing plant. Additionally, the metering door may be lowered until it is in contact with the conveyor so that the opening is completely closed. In this way, the interior of the accumulator housing may be effectively blocked off or isolated from the interior of the processing plant so that any fire which may originate in the accumulated refuse cannot spread to the interior of the plant. The closure of the metering door also effectively prevents access to the interior of the processing plant from the accumulator by animals and vermin of all types. Finally, the movement of the conveyor with respect to the lower edge of the door means induces a shearing action in the body of accumulated refuse, thus effecting some disintegration of the larger particles of refuse and also a desirable mixing action in the body of the refuse.

The conveyor employed in the refuse accumulator is of novel construction and functions to prevent the agglomeration of the accumulated refuse in large masses, and to partially break up the raw refuse as it is delivered to the accumulator from the collection trucks. The conveyor is substantially imperforate to even the smallest solid particles in the accumulated refuse so that no problem of sanitation is presented by the leakage or sifting of particles of refuse downwardly through the conveyor into the void or space under the conveyor.

From the foregoing discussion, it will be apparent that major objects of the present invention are to provide a device for storing accumulated raw municipal refuse in a sanitary manner, and for delivering uniform, metered amounts of the stored refuse to a processing plant for the recovery therefrom of useful products.

An additional object of the present invention is to provide a refuse accumulator and metering device in which some reduction of the average particle size of the refuse may be effected.

A further object of the present invention is to provide a device for accumulating and storing raw municipal refuse and the like in close proximity to a refuse processing plant in a safe and sanitary manner.

Another object of the present invention is to provide a bin for the storage of accumulated refuse in close proximity to a refuse processing plant, which bin is constructed to prevent the spread or propagation of a fire originating in the stored refuse to the interior of the plant.

Another object of the present invention is to provide a refuse accumulator and metering device which is relatively compact, simple and inexpensive in construction, and characterized by a long and trouble-free operating life.

An additional object of the present invention is to provide a simple, yet structurally strong, metering device for metering the discharge of refuse from a refuse storage bin in uniform, predetermined amounts.

Other objects and advantages of the invention will be evident from the following detailed description when read in conjunction with the accompanying drawings which illustrate my invention.

Figure 2:
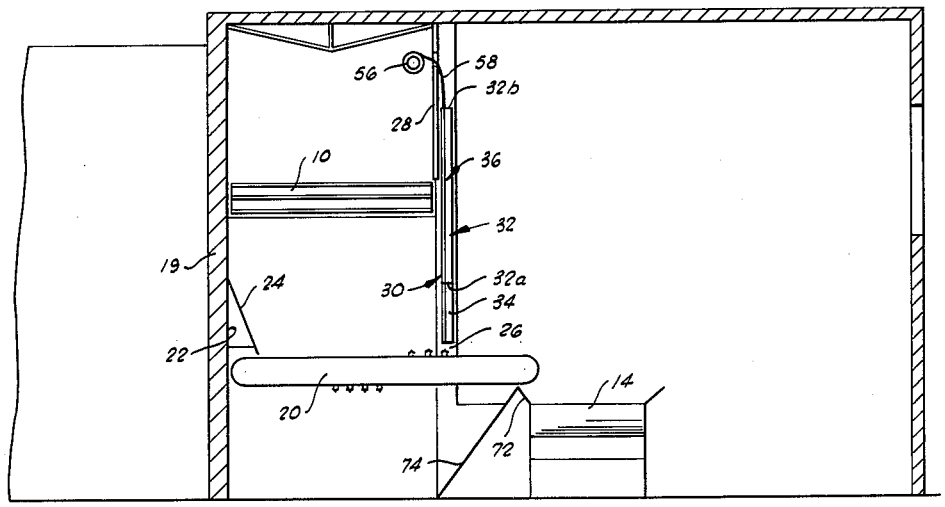
FIGURE 2 is a view in section taken along line 2—2 of FIG. 1.

In a preferred embodiment of the present invention, the novel refuse accumulator and metering device is utilized in combination with a pair of conveyor systems, one of which is utilized to move refuse delivered by municipal collection trucks into the accumulator, and the other of which is positioned adjacent the accumulator and inside the processing plant for receiving metered refuse discharged from the accumulator. Thus, in FIG. 1 of the drawings, the raw refuse is dumped by the collection trucks upon a conveyor 10 and is moved thereby into the refuse accumulator and metering device, designated generally by reference character 12. The accumulated raw refuse is then moved out of the accumulator and metering device onto a feed table conveyor located within the refuse processing plant and designated generally by reference character 14.

Figure 1:
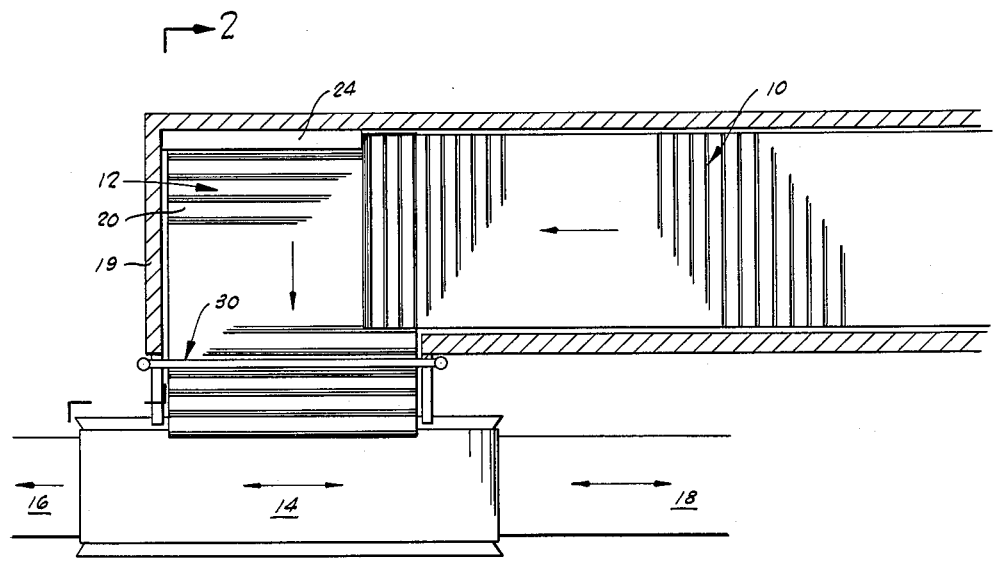
FIGURE 1 is a schematic plan view of the refuse accumulator and metering device of the present invention as it may typically be utilized in conjunction with a refuse processing plant.

Although the nature of the conveyors 10 and 14 may vary considerably according to the conditions of operation of the processing plant, in the preferred embodiment illustrated in FIG. 1, the conveyor 10 is slatted and is inclined at an acute angle to the horizontal so that liquids entrained in the raw refuse drain downwardly through the slats of the conveyor as the refuse is moved by the conveyor into the accumulator and metering device 12. The feed table conveyor 14 is preferably a belt-type conveyor which may be moved in either direction, as indicated by the double-headed arrow in FIG. 1. With this construction, the refuse deposited upon the feed table conveyor 14 from the accumulator and metering device 12 may either be moved by the reversible belt-type conveyor onto a picking table 16 where salvageable components, such as rags, tin cans, etc., may be manually removed from the refuse, or, the conveyor 14 may be reversed in its direction of movement to deliver very heavy objects, such as chunks of iron and steel, to a discard and selection conveyor 18 where suitable machinery may be utilized to remove these elements from the refuse.

The refuse accumulator and metering device 12 comprises a generally rectangularly shaped housing 19 having a conveyor 20 located in the lower portion thereof for supporting the accumulated refuse and moving it across the housing toward an opening through which it is discharged. As shown in FIGS. 1 and 2, one edge of the conveyor 20 extends under the slatted feed conveyor 10 and the conveyor 20 moves in a direction which is substantially normal to the direction of movement of the slatted feed conveyor 10. The refuse accumulated in the housing 19 is prevented from piling up against the rear wall 22 of the housing by means of an inclined baffle plate 24 which extends across the rear of the accumulator housing and is inclined at an angle of approximately sixty degrees to the vertical (see FIG. 2). At the side of the housing 19 opposite the rear wall 22 thereof, the conveyor 20 extends through a substantially rectangular opening 26 formed in the forward wall 28 of the housing.

Figures 3, 6:
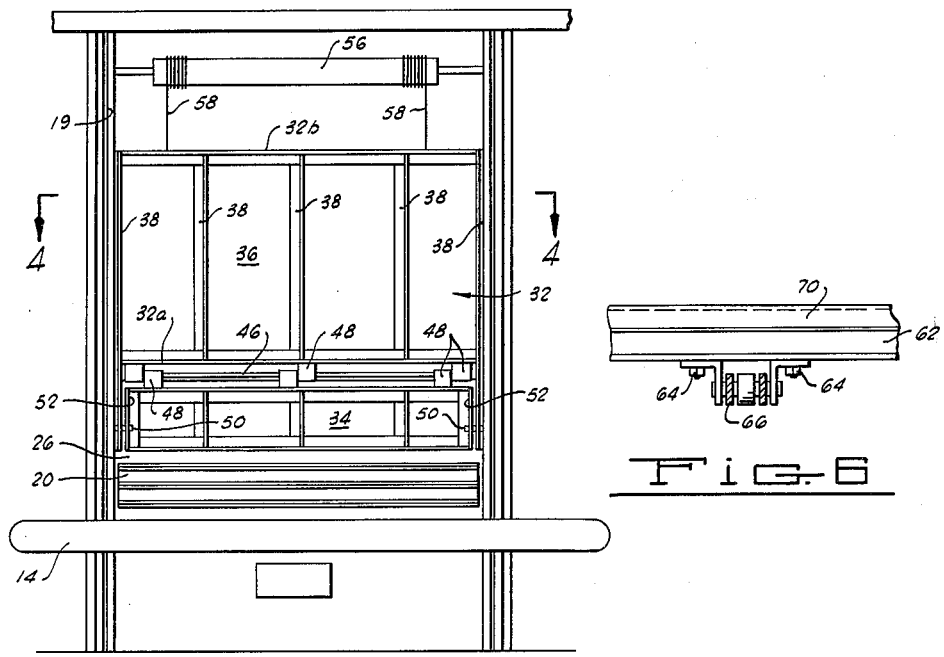
FIGURE 3 is a view in elevation of the refuse accumulator and metering device as it appears when viewed from inside the refuse processing plant.
FIGURE 6 is a sectional view taken along line 6—6 of FIG. 5.
Figure 4:
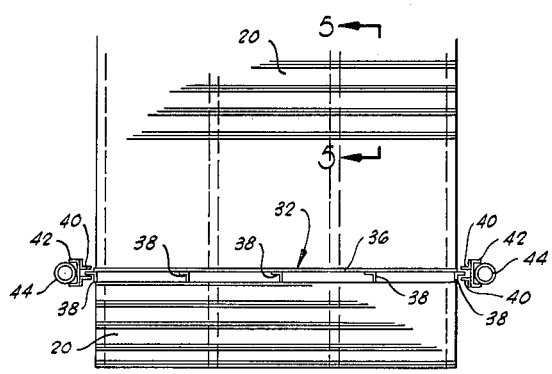
FIGURE 4 is a sectional view taken along line 4—4 of FIG. 3.

The metering device of the invention is designated generally by reference character 30 and is most clearly illustrated in FIGS. 2 and 3. The metering device 30 comprises a vertically movable metering door 32 having a safety door 34 hingedly connected to its lower edge 32a for pivotation about a horizontal axis. As shown in FIGS. 3 and 4, the metering door 32 comprises a flat plate 36 having a width substantially corresponding to the width of the accumulator housing 19 and having a plurality of angle irons 38 welded to the outer face thereof for reinforcement. As shown in FIG. 4, the two outermost angle irons 38 are secured along the vertical edges of the metering door 32 and extend into a vertical channel formed by two angle irons 40 mounted on the back side of a channel 42. Each of the channels 42 is in turn welded to one of the stationary structural members 44 of the building housing the processing plant.

As shown in FIG. 3, the safety door 34 is hinged to the lower edge 32a of the metering door 32 by means of a hinge rod 46 supported by suitable straps 48 secured to the lower edge of the metering door and the upper edge of the safety door. The two outermost angle irons 38 secured to the face of the metering door 32 project downwardly from the lower edge 32a thereof in juxtaposition to the safety door 34. Shear bolts 50 are extended through the projecting angle irons 38 into reinforcing members 52 secured to each vertical edge of the safety door 34. The safety door 34 is thus normally held in vertical alignment with the metering door 32.

In order to permit the metering door 32 and safety door 34 to be raised and lowered, a lifting reel 56 is positioned above the metering door, and a pair of cables 58 are reeved around the lifting reel and secured to the upper edge 32b of the metering door. When the cables 58 are unwound from the lifting reel 56, the metering door and safety door will gravitate downwardly. It will be apparent in referring to FIG. 2 that the size of the opening 26 through the forward wall 28 of the accumulator housing 19 may be varied by adjusting the vertical position of the metering door 32 and safety door 34.

Figure 5:
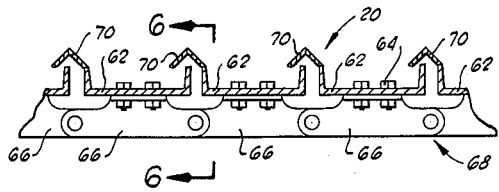
FIGURE 5 is a sectional view taken substantially along line 5—5 of FIG. 4.

The details of construction of the novel conveyor 20 of the present invention are illustrated in FIGS. 5 and 6. The conveyor 20 comprises a plurality of channels 62 secured in parallel and spaced relation by bolts 64 to the links 66 of endless driving chains 68. Each channel 62 has an angle iron 70 welded to one flange thereof at an angle of approximately forty-five degrees, and the spacing between adjacent channels 62 is such that the conveyor 20 has no openings therethrough through which refuse may fall or become jammed in the conveyor. It will be noted that the spacing between adjacent channels 62 of the conveyor 20 is varied as the conveyor turns over sprockets (not shown) at either end of the conveyor and that the angle irons 70 are dimensioned to allow such movement of the channels without interference.

In order to prevent refuse from clinging to the underside of the conveyor 20 and returning with the conveyor into the accumulator housing, a strong blade 72 (see FIG. 2) is supported directly under the conveyor 20 adjacent its end which projects over the feed table conveyor 14. It may also be noted that a wall 74 extends from the wiper blade 72 to the floor of the processing plant building to prevent any possible access to the accumulator housing when the metering door 32 and safety door 34 are lowered into contact with the top of the conveyor 20.

Operation

Raw refuse is brought to the processing plant by refuse collection trucks and is dumped by the trucks upon one end (not shown) of the inclined, slatted conveyor 10. The individual loads of refuse from the collection trucks are then moved by the slatted conveyor 10 into the refuse accumulator housing 19. As the raw refuse is moved upwardly by the inclined, slatted conveyor 10, a substantial amount of the liquids entrapped in the raw refuse will be drained therefrom, and will drip downwardly through the slatted conveyor into a suitable collection system. When the refuse falls from the upper end of the conveyor 10 into the accumulator housing 19, it comes to rest upon the conveyor 20. Accumulation of refuse against the rear wall 22 of the housing is prevented by the inclined baffle plate 24 which also functions to prevent any refuse from falling through the opening between the rear wall 22 and the end of the conveyor 20.

Since the angle irons 70 of the conveyor 20 present relatively sharp upper edges for contact with the falling refuse, some disintegration of the refuse and particle size reduction is effected. Also, it will be perceived that the construction of the conveyor 20 prevents any solid particles of refuse from passing through the conveyor and falling downwardly into the void in the bottom of the accumulator housing 19. However, should any substantial amount of liquid be included in the refuse which is dumped into the accumulator housing 19, this liquid can pass through the openings between the angle irons 70 and channel members 62 and gravitate downwardly into the bottom of the accumulator housing. A suitable washing and drippings collection system (not shown) may be provided in the bottom of the housing 19 to keep the housing clean and salvage the liquids which drip through the conveyor.

The raw refuse which is accumulated in the housing 19 is moved by the conveyor 20 across the housing and through the opening 26 in the forward wall 28 thereof. In referring to FIG. 2, it will be observed that the refuse carried on top of the conveyor 20 must pass beneath the safety door 34 and metering door 32, and that the opening afforded for passage of the refuse is defined in its area by the vertical position of the metering and safety doors. Thus, the rate at which raw refuse is fed from the accumulator housing onto the feed table conveyor 14 is controlled by the position of the vertically movable metering device 30 comprising the metering door 32 and safety door 34.

The drag imposed upon the upper surface of the raw refuse by the safety door 34 coupled with the horizontal force imparted to the body of refuse by the horizontally moving conveyor 20 sets up a shearing action in the body of refuse which is effective to accomplish some reduction in the average particle size of the refuse as well as a substantial amount of mixing. In the event that a large bulky article, such as a garbage can or large steel plate, is deposited in the accumulator housing and is moved forwardly by the conveyor 20 against the safety door 34, the shear bolts 50 will be sheared away to allow the safety door to pivot upwardly. Damage to the metering device 30 or the conveyor 20 is thus prevented.

When the operations of the processing plant are ceased so that it is no longer desirable to feed metered amounts of refuse to the feed table conveyor 14, the metering door 32 and safety door 34 are lowered by rotating the reel 56 to unreel the cables 58. The lower edge of the safety door 34 is thus lowered into contact with the conveyor 20 so that the interior of the processing plant is effectively isolated from the accumulator 12. In this manner, the unobserved entrance of vermin, rats or other animals into the processing plant is prevented. Such ingress is also prevented by the wall 28 located beneath the conveyor 20. It will also be understood that the metering door 32 and its associated safety door 34 may be lowered to close the opening 26 in the accumulator housing 19 in order to isolate or prevent the spread of any fire which may originate in the refuse accumulated in the accumulator housing.

From the foregoing discussion, it will be apparent that the present invention provides a refuse accumulator and metering device which is of simple, but very strong, construction, and which will function to effectively meter uniform amounts of stored refuse to a refuse processing plant. The construction of the accumulator and metering device provides desirable safegurads against the hazards of fire originating in the accumulated refuse, and against the possible unobserved entrance into the processing plant of rats and vermin which may frequent the accumulated refuse. The device provides for the metering of the refuse at any desired rate of flow, and is especially advantageous in that a considerable amount of comminution and maxing is afforded by the construction of the novel conveyor utilized in the device, and by the manner in which such conveyor cooperates with the novel metering means which is employed.

Although this invention has been described with a certain degree of particularity, it is manifest that many changes may be made in the details of construction and the arrangement of components without departing from the spirit and scope of this disclosure. Accordingly, this invention should be considered as limited only by the scope of the appended claims.

I claim:
1. In a system for composting waste material such as municipal refuse and the like, the improvement which comprises a generally rectangularly shaped housing for retaining accumulated raw refuse; metering means forming at least a portion of one side wall of said housing for metering the discharge of said refuse from said housing through an opening under said one side wall, said metering means comprising a vertically movable metering door; a metallic safety door hingedly connected to the lower edge of said metering door for vertical movement therewith; frangible means retaining said safety door in vertical alignment with said metering door; and means for adjusting the vertical position of said metering door and safety door to vary the size of the opening under said one side wall; and a conveyor in the bottom of said housing for supporting said refuse and moving said refuse through said opening.

2. The improvement in a system for composting waste material as claimed in claim 1 wherein said metering door comprises a vertically extending, rectangularly shaped flat plate having strips of angle iron secured along its lateral, vertically extending edges and projecting downwardly below the lower, horizontal edge of said metering door; and wherein said frangible means comprises a plurality of shear pins extending through said downwardly projecting portions of said angle iron strips and into said safety door; and further characterized to include vertically extending channel means adjacent the lateral edges of said metering door and cooperating with said strips of angle iron to guide said metering door in its vertical movement.

3. In a system for composting waste material such as municipal refuse and the like, the improvement which comprises a generally rectangularly shaped housing for retaining accumulated raw refuse; metering means forming at least a portion of one side wall of said housing for metering the discharge of said refuse from said housing through an opening under said one side wall; and a conveyor at the bottom of said housing for supporting said refuse and moving said refuse through said opening, said conveyor comprising a plurality of parallel endless chains; a plurality of elongated U-shaped channel members extending across the tops of the parallel endless chains and each having a flat bight portion secured to said chains and each having flanged portions projecting upwardly from said chains normal to said bight portion and at each longitudinal edge of said bight portion; and an elongated strip of angle iron secured to the longitudinal edge of one of said flange portions on each of said elongated channel members at an angle of approximately 45°, each of said channel members being spaced along said chain from the next adjacent channel members by a distance of substantially less than the hypotenuse of said angle iron whereby said angle iron strips overlap said channel members to prevent solid waste material from gravitating downwardly through said conveyor.

4. In a system for composting waste material, such as municipal refuse and the like, the improvement which comprises a generally rectangularly shaped housing for retaining accumulated raw refuse; metering means forming at least a portion of one side wall of said housing for metering the discharge of said refuse from said housing through an opening under said one side wall, said metering means comprising a first rigid, vertically extending, generally rectangular portion vertically movable in the plane of said one side wall, and a second rigid portion pivotally connected to the lower edge of said first portion and forming one of the edges of said opening, said second portion being vertically movable with said first portion to vary the size of said opening and yieldable means retaining said second rigid portion against pivotation relative to the first portion when a force of predetermined maximum magnitude is applied to said second portion in a direction substantially normal to said one side wall from the inside of said housing, and yielding to permit said second rigid portion to pivot relative to said first portion when a force greater than said force of predetermined maximum magnitude is applied to said second portion; and means in the bottom of said housing for supporting said refuse and moving said refuse through said opening.

References Cited in the file of this patent

UNITED STATES PATENTS

| | | | |
|---|---|---|---|
| 1,031,481 | Snyder | | July 2, 1912 |
| 1,323,611 | Ream | | Dec. 2, 1919 |
| 2,398,821 | Davidson | | Apr. 23, 1946 |
| 2,496,463 | Gaddis | | Feb. 7, 1950 |
| 2,668,629 | Bahlman | | Feb. 9, 1954 |
| 2,689,069 | Sparrow et al. | | Sept. 14, 1954 |
| 2,946,597 | Simonsen | | July 26, 1960 |
| 2,960,988 | Peterson | | Nov. 22, 1960 |

FOREIGN PATENTS

| | | | |
|---|---|---|---|
| 75,960 | Norway | | Nov. 21, 1949 |